3,153,042
MORPHINONE AND CODEINONE DERIVATIVES
Jack Fishman, Rego Park, N.Y., assignor to
Mozes Juda Lewenstein, Kew Gardens, N.Y.
No Drawing. Original application May 17, 1961, Ser.
No. 110,628. Divided and this application Jan. 24,
1963, Ser. No. 253,765
11 Claims. (Cl. 260—285)

This invention provides novel compounds, a novel method for their preparation and novel compositions containing the compounds.

The present application is a divisional application of United States Serial No. 110,628, filed May 17, 1961, in the name of Jack Fishman.

COMPOUNDS

The novel compounds are carboxymethoxyloxime compounds derivable by reaction of morphine and codeine derivatives with carboxymethoxylamine. The compounds include morphinone and codeinone carboxymethoxyloximes, and dihydromorphinone and dihydrocodeinone carboxymethoxyloximes.

The morphinone and codeinone carboxymethoxyloximes are of the formula

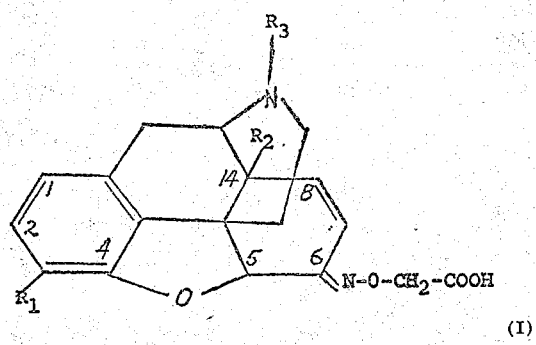

wherein $R_1$, $R_2$ and $R_3$, respectively, are selected from the group consisting of:

(a) For $R_1$ the group methoxy and hydroxy,
(b) For $R_2$ the group hydrogen and hydroxy, and
(c) For $R_3$ the group hydrogen, lower alkyl, and lower alkenyl.

The substituent $R_3$ can be a lower alkyl of about 1–4 carbon atoms and the preferred lower alkyl is methyl. It can be an alkenyl of about 2–4 carbon atoms, and the preferred alkenyl is allyl.

The compounds can be in combined form such as the hydrochlorides, sulfates or metal salts thereof, for example alkali metal or alkaline earth metal salts. Hydrochlorides, sulfates and sodium salts are preferred forms.

The following are specific examples of the compounds (I):

Codeinone-6-carboxymethoxyloxime
14-hydroxycodeinone-6-carboxymethoxyloxime.
Nor-codeinone-6-carboxymethoxyloxime.
N-allyl-nor-codeinone-6-carboxymethoxyloxime.
Morphinone-6-carboxymethoxyloxime.
14-hydroxymorphinone-6-carboxymethoxyloxime.
Nor-morphinone-6-carboxymethoxyloxime.
N-allyl-nor-morphinone-6-carboxymethoxyloxime.

The dihydromorphinone and dihydrocodeinone carboxymethoxyloximes are of the formula

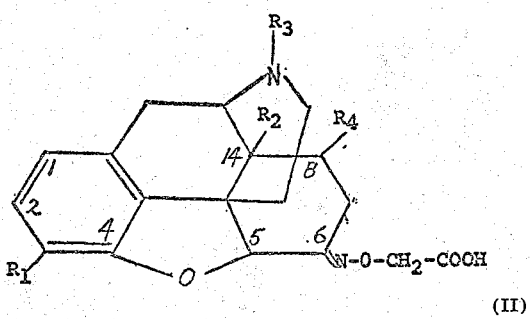

wherein $R_1$, $R_2$, $R_3$ and $R_4$, respectively, are selected from the group consisting of:

(a) For $R_1$ the group methoxy and hydroxy,
(b) For $R_2$ the group hydrogen and hydroxy,
(c) For $R_3$ the group hydrogen, lower alkyl, and lower alkenyl.
(d) For $R_4$ the group hydrogen and hydroxy.

As to the substituent $R_3$, what is said with respect to this substituent from compounds (I), applies also for this substituent of compounds (II).

Further, compounds (II) can also be in combined form such as the hydrochlorides, sulfates, or metal salts thereof, for example alkali metal and alkaline earth metal salts. Hydrochlorides, sulfates, and sodium salts are preferred forms.

The following are specific examples of compounds (II):

Dihydrocodeinone-6-carboxymethoxyloxime.
14-hydroxy-dihydrocodeinone-6-carboxymethoxyloxime.
8,14-dihydroxy-dihydrocodeinone-6-carboxymethoxyloxime.
Dihydromorphinone-6-carboxymethoxyloxime.
14-hydroxy-dihydromorphinone-6-carboxymethoxyloxime.
8,14-dihydroxy-dihydromorphinone-6-carboxymethoxyloxime.

PREPARATION

The compounds of the invention can be prepared by contacting the corresponding 6-carbonyl compound with carboxymethoxylamine at a temperature and for a time sufficient for formation of the carboxymethoxyloxime.

The corresponding 6-carbonyl compound and the carboxymethoxylamine hydrochloride can be dissolved in a solvent such as an organic solvent, for example an alcohol, an activator such as an alkali or salt added, and the resulting mixture heated, for example, at a reflux temperature for 1–24 hours.

If dihydro compound (II) is desired, the corresponding dihydro 6-carbonyl compound can be used as the starting material or compound (I) can be made and converted to the dihydro compound by hydrogenation, e.g. hydrogenation by contacting compound (I) with hydrogen in the presence of palladium on charcoal.

UTILITY

It will be observed that the compounds of the invention are of the class morphine and codeine compounds Many compounds of this class are known to have useful therapeutic properties, in particular analgesic and antitussive properties. Hence, the compounds of the invention are alternative or improved analgesics and antitussives. The compounds of the invention can be tested by known procedures for effectiveness as analgesics and antitussives.

The novel compounds can also be used as intermediates to make other compounds of the class morphine and codeine compounds, and the end products will be possible alternative or improved analgesics or antitussives. Reactions known in the art can be used to make the end products. It will be observed that compounds (I) are intermediates for compounds (II) since the latter can be made from the former by hydrogenation as described above. Dihydrocodeinone-6-carboxymethoxyloxime is a long-acting antitussive of good effectiveness and 14-hydroxydihydrocodeinone-6-carboxymethoxyloxime is a long-acting analgesic having better analgesic action than codeine.

One of the major drawbacks of morphine, codeine and known derivatives of these compounds is their short duration of effect. It is usually limited to 3–4 hours. This is particularly undesirable at night time when patients are awakened after a few hours, because of returning pain or cough. Further, when the pain relieving drug is administered by the parenteral route, the repeated injections necessitated by the short duration of effect, are irritating and objectionable to patients.

Many attempts have been made to produce longer lasting analgesics and antitussives but none of these have been successful and found of real value. Then too, it has been proposed to administer analgesics in the form of depots. This, however, may be dangerous because of sudden and undesired release of large doses.

It has now been found that the compounds of the invention are analgesics and antitussives of long duration of such effects. This is demonstrated by 14-hydroxydihydrocodeinone - 6 - carboxymethoxyloxime and dihydrocodeinone-6-carboxymethoxyloxime which, respectively, is a long lasting analgesic and a long lasting antitussive. The potency is lower but this can be compensated for by administering larger doses and compensation in this manner is without increasing the incidence of side effects. These carboxymethoxyloximes offer therefore a valuable improvement in the treatment of pain and cough. They make it possible for the physician by administering them at bed time to give the patient relief from pain and cough for a full night's sleep, thus affording him uninterrupted rest and obviating the necessity of an injection every 3 to 4 hours. During the day prolonged relief will contribute to patient's comfort and speed his recovery.

COMPOSITIONS

The compounds of the invention can be provided in a form suitable for pharmaceutical use or testing by combining them with a pharmaceutically acceptable inert carrier. Carriers known in the art for morphine and codeine derivatives are suitable. Thus, distilled water or milk sugar and starch can be used, depending on the manner of administration, which can be parenterally or orally.

*Example 1*

10 grams of 14-hydroxycodeinone and 10 grams of carboxymethoxyamine hemihydrochloride were dissolved in 500 cc. of ethanol and 45 ml. of 2 N KOH and refluxed for 3 hours. The white precipitate was filtered off to give 14-hydroxycodeinone-6-carboxymethoxyloxime hydrochloride.

*Example 2*

1 gram of 14-hydroxycodeinone-6-carboxymethoxyloxime hydrochloride was dissolved in 50% ethanol and hydrogenated over palladium on charcoal. After the uptake of 1.2 moles of hydrogen the solution was filtered, taken to dryness and the residue recrystallized from water to give 14-hydroxydihydrocodeinone-6-carboxymethoxyloxime hydrochloride.

*Example 3*

1 gram of 14-hydroxymorphinone plus 1 gram of carboxymethoxyamine hemihydrochloride was dissolved in 50 cc. of ethanol. 2 grams of anhydrous sodium acetate was added and the mixture was refluxed for 5 hours. The solution was concentrated under vacuum to near dryness, dissolved in 20 cc. of water and made to pH 2 with concentrated hydrochloric acid. The 14-hydroxymorphinone-6-carboxymethoxyloxime hydrochloride crystallized on cooling.

*Example 4*

1 gram of 14-hydroxymorphinone-6-carboxymethoxyloxime hydrochloride was dissolved in 50% ethanol and hydrogenated with hydrogen over palladium on charcoal. After 1.2 mole of hydrogen had been absorbed, the solution was filtered, taken to dryness and the residue recrystallized from ethanol and ether to yield 14-hydroxydihydromorphinone-6-carboxymethoxyloxime hydrochloride.

*Example 5*

10 grams of dihydromorphinone, 10 grams carboxymethoxyamine hemihydrochloride and 20 grams anhydrous sodium acetate were suspended in 500 ml. ethanol. The mixture was refluxed over night, and the ethanol evaporated under vacuum. The residue was taken up in 100 cc. water, made to pH 9 with Na$_2$CO$_3$ and extracted with chloroform. The aqueous layer was made to pH 2 with concentrated hydrochloric acid and cooled. The dihydromorphinone-6-carboxymethoxyloxime hydrochloride is filtered off.

*Example 6*

Dihydrocodeinone-6-carboxymethoxyloxime was obtained by refluxing 1 gram of dihydrocodeinone, 1 gram carboxymethoxyamine hydrochloride in 50 cc. ethanol with 4.5 cc. 2 N potassium hydroxide for 4 hours. The solution is taken to dryness, taken up in chloroform, filtered and evaporated. The residue is taken up in 10 cc. ethanol, concentrated NH$_4$OH is added, and the ethanol removed under nitrogen. Cooling gives crystals of the product M.P. 145–150°.

*Example 7*

10 grams of 8,14-dihydroxydihydrocodeinone, 10 grams of carboxymethoxyamine hemihydrochloride and 20 grams anhydrous sodium acetate were suspended in 500 ml. ethanol. The mixture was refluxed overnight and the ethanol evaporated under vacuum. The residue was taken up in 90 cc. water, made to pH 11 with Na$_2$CO$_3$ and extracted with ethyl acetate. The aqueous layer was made to pH 2 with concentrated sulfuric acid and cooled. The 8,14-dihydroxydihydrocodeinone-6-carboxymethoxyloxime sulfate is filtered off.

*Example 8*

10 grams of codeinone is dissolved in 150 cc. of ethanol and 45 cc. of 2 N KOH is added. After the addition of 10 grams of carboxymethoxyamine hydrochloride the mixture is refluxed for 5 hours. The solvent is removed under vacuum and the residue taken up in chloroform and filtered. After evaporating the chloroform the residue is crystallized from water to give codeinone-6-carboxymethoxyloxime.

*Example 9*

5 grams of nor-codeinone is dissolved in 50 cc. of ethanol. To this solution 5 grams of sodium acetate and 5 grams of carboxymethoxyamine hydrochloride is added and the mixture refluxed overnight. The solvent is evaporated under vacuum, the residue is taken up in 15 cc. ethanol and acidified to pH 1 with hydrochloric acid, it is then filtered and the nor-codeinone-6-carboxymethoxyloxime hydrochloride is obtained on addition of ether.

Example 10

5 grams of N-allyl-nor-codeinone and 5 grams of the reagent carboxymethoxylamine hydrochloride is dissolved in 100 cc. of ethanol. After the addition of 22.5 cc. of 2 N KOH the solution is refluxed for 6 hours. The solvent is removed under vacuum, the residue taken up in 20 cc. of 1 N NaOH and extracted with 50 cc. of chloroform. The basic solution is adjusted to pH 6 with hydrochloric acid and the product N-allyl-nor-codeinone-6-carboxymethoxyloxime crystallized out on cooling.

Example 11

1 gram of morphinone, 1 gram of carboxymethoxylamine hydrochloride, 1 gram of sodium acetate in 50 cc. of ethanol is refluxed for 3 hours. This solution is concentrated to half volume and acidified to pH 1 with hydrochloric acid. After filtration, the product, morphinone-6-carboxymethoxyloxime hydrochloride is obtained by the addition of ether to the solution.

Example 12

5 grams of nor-morphinone, 5 grams of carboxymethoxylamine hydrochloride and 5 grams of sodium acetate in 150 cc. of ethanol is refluxed for 8 hours. The solution is taken to dryness and the residue dissolved in 25 cc. of ethyl alcohol. After filtration, the pH is adjusted to 1 with hydrochloric acid. Upon cooling the product nor-morphinone-6-carboxymethoxyloxime hydrochloride separates out.

Example 13

5 grams of N-allyl-nor-morphinone and 5 grams of carboxymethoxylamine hydrochloride is dissolved in 100 cc. of ethanol. 5 grams of sodium acetate is added and the mixture refluxed for 10 hours. The solution is then cooled and filtered to remove the precipitate. The filtrate is then taken to dryness and the residue crystallized from a small amount (10 cc.) of water. The product of N-allyl-nor-morphinone-6-carboxymethoxyloxime is obtained as white flakes.

Example 14

5 grams of 8,14-dihydroxydihydromorphinone and 5 grams of carboxymethoxylamine hydrochloride is dissolved in 150 cc. of ethanol. 22.5 cc. of 2 N KOH solution is added and the mixture refluxed for 6 hours. It is cooled, filtered and taken to dryness under vacuum. The residue is taken up in 15 cc. of ethanol, filtered again and the pH brought to 1 by addition of concentrated hydrochloric acid. The product 8,14-dihydroxydihydromorphinone-6-carboxymethoxyloxime hydrochloride is separated out upon the dropwise addition of ether.

The elementary analysis for the products of Examples 1–7 checked well with the expected structures. The compounds showed u.v. absorption at 287 mμ typical for the aromatic methyl ether. Infrared absorption showed bands for carboxyl group at 1725 cm.$^{-1}$, and showed unsaturation at 1607 cm.$^{-1}$ and 1637 cm.$^{-1}$.

As will be observed from the foregoing examples, whether the compounds of the invention are in the form of acid salts such as the hydrochloride, depends on the method preparation.

While specific embodiments of the invention have been particularly described, various modifications will occur to those skilled in the art and it is intended to secure by these Letters Patent all such alternatives.

What is claimed is:

1. A compound selected from the group consisting of a chemical having the following formula and salts of said chemical:

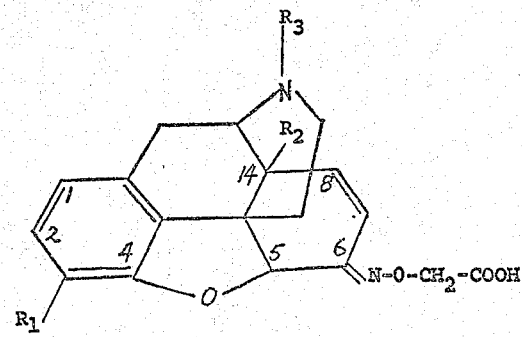

wherein $R_1$, $R_2$ and $R_3$ respectively, are selected from the group consisting of:
  (a) for $R_1$ the group methoxy and hydroxy,
  (b) for $R_2$ the group hydrogen and hydroxy, and
  (c) for $R_3$ the group hydrogen, lower alkyl, and lower alkenyl.

2. Codeinone-6-carboxymethoxyloxime.
3. 14-hydroxycodeinone-6-carboxymethoxyloxime.
4. Nor-codeinone-6-carboxymethoxyloxime.
5. N-allyl-nor-codeinone-6-carboxymethoxyloxime.
6. Morphinone-6-carboxymethoxyloxime.
7. 14-hydroxymorphinone-6-carboxymethoxyloxime.
8. Nor-morphinone-6-carboxymethoxyloxime.
9. N-allyl-nor-morphinone-6-carboxymethoxyloxime.
10. A method of making compounds of claim 1, which comprises contacting at elevated temperatures the corresponding 6-carbonyl compound with carboxymethoxylamine at a temperature and for a time sufficient for formation of the carboxymethoxyloxime.
11. A method of making compounds of claim 1, which comprises contacting the corresponding 6-carbonyl compound with carboxymethoxylamine in an organic solvent for said reactants at reflux temperatures for about 1 to 24 hours so as to form the carboxymethoxyloxime.

No references cited.